United States Patent [19]

Gaines

[11] 4,305,918
[45] Dec. 15, 1981

[54] PURGE CONTROL FOR AMMONIA PLANT

[75] Inventor: Larry D. Gaines, Bartlesville, Okla.

[73] Assignee: Phillips Petroleum Company, Bartlesville, Okla.

[21] Appl. No.: 822,179

[22] Filed: Aug. 5, 1977

[51] Int. Cl.³ .............................................. C01C 1/04
[52] U.S. Cl. ................................ 423/359; 23/230 A; 422/62; 422/112; 422/148; 422/187; 422/234; 423/DIG. 5
[58] Field of Search ............... 423/359, 360, 361, 362, 423/363, 352, 351, 522, 529, 533, 573 G, DIG. 5; 23/230 A, 232 E, 253 A, 255 E, 255 R, 260, 289; 422/148, 187, 234, 112, 62

[56] References Cited
U.S. PATENT DOCUMENTS

| | | | |
|---|---|---|---|
| 2,893,845 | 7/1959 | Erickson | 23/260 |
| 2,894,821 | 7/1959 | Jordan et al. | 423/362 |

OTHER PUBLICATIONS

Wherry et al., Guide to Profitable Computer Control, Process Instrumentation Manual, 1968, pp. 69-72.

*Primary Examiner*—O. R. Vertiz
*Assistant Examiner*—Wayne A. Langel

[57] ABSTRACT

Control of the synthesis loop pressure of an ammonia plant is accomplished by automatically changing the purge rate of the recycle gas to maintain optimum synthesis loop pressure. The control logic of this invention allows compressor speed to be set at a constant value and suction pressure to the first stage of the synthesis loop compressor to be maintained by changing the purge rate of the recycle gas. This allows the synthesis loop pressure to seek the highest possible value at the given feed rates of the synthesis gas and compressor speed assuring optimum compressor loading.

If the feed rate of synthesis gas is low, additional control is achieved by using the synthesis loop pressure signal or the concentration of inerts signal to vary the compressor speed. A variation of this control logic for providing additional control where the feed rate of the synthesis gas is low is to use the synthesis loop pressure signal or the concentration of inerts signal to manipulate the purge rate of the recycle gas and to use the suction pressure to the first stage of the ammonia plant synthesis loop to manipulate compressor speed. Another variation of this control logic is to use the suction pressure to the first stage of the ammonia synthesis loop to vary the compressor speed and use either the synthesis loop pressure signal, the concentration of inerts signal, or the RPM of the compressors signal to vary the purge rate of the recycle gas. All of these schemes for providing additional control where the feed rate of the synthesis gas is low allow the synthesis loop pressure to seek the highest possible value at the low feed rate of synthesis gas assuring optimum compressor loading under all modes of operation.

25 Claims, 4 Drawing Figures

PURGE CONTROL FOR AMMONIA PLANT

This invention relates to method and apparatus for automatically controlling an ammonia plant. In a specific aspect this invention relates to method and apparatus for the automatic control of synthesis loop pressure in an ammonia plant. In yet another aspect this invention relates to method and apparatus for the automatic control of the purge rate of the recycle gas in an ammonia plant. In still another aspect this invention relates to control method and apparatus which allows the synthesis loop pressure of an ammonia plant to seek the highest possible value at any given synthesis gas flow rate and compressor speed assuring optimum compressor loading and efficient operation of an ammonia plant.

Ammonia plant synthesis loop pressure is generally controlled by manually setting the purge rate of the recycle gas. Compressor speeds are then regulated by the suction pressure at the inlet to the first stage of the ammonia plant synthesis loop. Manually controlling the purge rate of the recycle gas results in the purge rate being too high. This results in a synthesis loop pressure that is less than optimum and a resulting reduced efficiency of the ammonia plant due to less than optimum compressor loading for the given flow rate of synthesis gas and compressor speeds.

Accordingly, it is an object of this invention to provide method and apparatus for automatically controlling an ammonia plant. Another object of this invention is to provide method and apparatus for automatically controlling the synthesis loop pressure in an ammonia plant. Yet another object of this invention is to provide method and apparatus for automatically controlling the purge rate of the recycle gas in an ammonia plant. Still another object of this invention is to provide control method and apparatus which allows the synthesis loop pressure of an ammonia plant to seek the highest possible value at any given synthesis gas flow rate and compressor speed assuring optimum compressor loading and efficient operation of an ammonia plant.

In accordance with the invention control method and apparatus are provided whereby the suction pressure to the first stage of the synthesis loop compressor of an ammonia plant is measured by a pressure sensor which sends a signal to a controller which manipulates the purge rate of the recycle gas by means of a control valve in the purge line. Compressor speed can be set at some desired constant value. This control logic provides optimum synthesis loop pressure for a given flow rate of synthesis gas, which primarily determines the suction pressure to the first stage of the synthesis loop compressor, and the given constant compressor speed.

If the feed flow rate of the synthesis gas ranges low, i.e. below the given flow rate of synthesis gas, this invention can provide additional control by three different techniques. The additional control is provided in one technique by measuring the concentration of inerts in the recycle gas and measuring the synthesis loop pressure. Signals from these measurements are provided to controllers and if either measurement is outside of the respective acceptable operating ranges, then that signal is used to reduce the compressor speed. This results in an increase in the suction pressure at the inlet to the first stage of the synthesis loop compressor and a corresponding increase in the purge rate of the recycle gas in the manner previously described. This results in the reduction of the concentration of inert gases in the recycle gas and a reduction in the pressure in the synthesis loop to acceptable operating levels.

The second technique of providing additional control also involves the measurement of the synthesis loop pressure and the concentration of inerts in the recycle gas. However, in this control technique, instead of using these signals to vary compressor speed, the signals are used to vary the purge rate of the recycle gas directly if either the concentration of inerts or the pressure in the synthesis loop is outside the respective acceptable operating range. In this technique the suction pressure at the inlet to the first stage of the synthesis loop is measured and the suction pressure signal is used to manipulate compressor speed rather than purge rate of the recycle gas. If the concentration of inerts or the pressure in the synthesis loop becomes too high the purge rate is increased, resulting in a decrease in the concentration of inerts in the recycle gas and a decrease in the pressure in the synthesis loop and a corresponding decrease in the suction pressure at the inlet to the first stage of the synthesis loop compressor. The reduced suction pressure will cause the compressor speed to be lowered again resulting in optimum operating conditions of the ammonia plant where the feed rate of the synthesis gas is low.

The third technique of providing additional control is to measure the synthesis loop pressure, the concentration of inerts in the recycle gas, and the RPM of the compressors. The RPM of the compressors is manipulated directly by a signal representative of the suction pressure at the inlet to the first stage of the synthesis loop. If the suction pressure is high, indicating a high feed rate of synthesis gas, then the RPM of the compressors will be near a maximum value and the signal representing the RPM of the compressor will control the purge rate of the recycle gas. If the suction pressure is low then the compressor RPM will be lower and the signals representative of the inerts concentration or the synthesis loop pressure will manipulate the purge rate if either of these values exceeds their respective acceptable operating ranges. The purge rate will be increased, resulting in a decrease in the concentration of inerts in the recycle gas and a decrease in the pressure in the synthesis loop. The suction pressure at the inlet to the first stage of the synthesis loop will be decreased, causing compressor speed to be lowered again, resulting in optimum operating conditions of the ammonia plant where the feed rate of the synthesis gas is low.

Other objects and advantages of the invention will be apparent from the description of the invention and the appended claims thereto as well as from the detailed description of the drawings in which:

Figure 1:
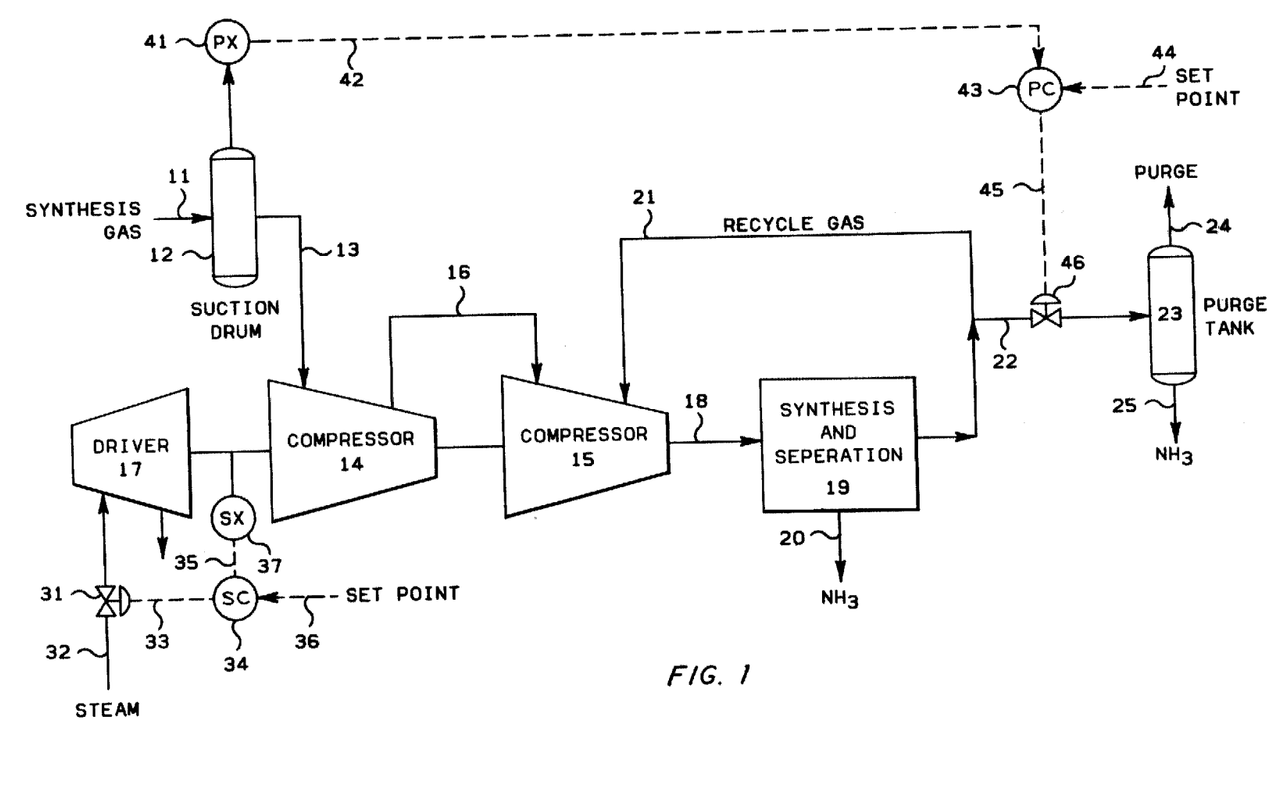
FIG. 1 is a representation of a process for the manufacture of ammonia with the associated means of controlling the manufacturing process when the synthesis gas flow rate is high.

Referring now to FIG. 1, a synthesis gas containing hydrogen and nitrogen in the approximate mol ratio of 3:1 is obtained from any suitable source and fed through synthesis gas conduit means 11 into suction drum 12, which has been referred to previously as the inlet of the first stage of the synthesis loop compressor. From suction drum 12 the synthesis gas is fed through conduit means 13 into first stage compressor 14 and from compressor 14 through conduit means 16 into second stage compressor 15. This two-stage compression system which is powered by driver 17 compresses the synthesis gas to a high pressure. Recycle gas is mixed with the synthesis gas in compressor 15 and the mixture is fed through conduit means 18 into a synthesis and separation system 19. There the mixed gas is passed in contact with a suitable catalyst under suitable reaction conditions for the formation of ammonia. The effluent gases are then cooled in the synthesis and separation system 19 to condense out the ammonia product as a liquid, which is withdrawn from the process through conduit means 20.

All the hydrogen and nitrogen will not be converted to ammonia. The remaining unreacted gases are withdrawn from the synthesis and separation system 19 and most of the thus withdrawn unreacted gases are passed through recycle gas conduit means 21 as recycle gas to be mixed with fresh synthesis gas in compressor 15. The recycle gas will also contain certain gases such as Argon which are inert in the reaction of hydrogen and nitrogen to form ammonia. In order to avoid a buildup of these inert gases in the recycle gas to such an extent that their partial pressure effect becomes deleterious to the reaction, a portion of the recycle gas is intermittently or continuously purged from the system through purge gas conduit means 22 into purge tank 23. Purge gas is vented through conduit means 24 and any ammonia condensing out from the recycle gas is withdrawn from tank 23 through conduit means 25.

The loop formed by the two stage compression system 14 and 15, the synthesis and separation system 19 and conduit means 21 for passing the recycle gas to the second stage of the two stage compressor system will be referred to as the synthesis loop.

As is shown in FIG. 1, the rate of flow of steam to the driver 17 determines the speed at which compressor 14 and compressor 15 will be driven. The rate at which steam is provided to the driver 17 is controlled by pneumatic control valve 31 located in steam conduit means 32. Flow settings for control valve 31 are determined by valve set control signal 33. Control signal 33, which manipulates control valve 31, issues from speed controller 34 in response to the measured RPM of the compressor (signal 35 from tachometer 37) and the applied RPM set point signal 36. A constant compressor speed, usually near the maximum RPM for the compressors, is thus provided.

Pressure transducer 41 measures the pressure in suction drum 12 and transmits an analog signal 42 representative thereof to flow controller 43. Pressure controller 43 is also provided with a set point signal 44. The set point signal 44 is representative of the desired optimum pressure in suction drum 12. Pressure controller 43 compares the set point signal 44 and the signal from pressure transducer 41 by subtracting the pressure signal from the set point signal to determine a value E which is essentially a difference signal. A control signal 45, which is responsive to E, is then sent from controller 43 to pneumatic control valve 46. The controller 43 may be of the proportional type in which case the control signal 45 to control valve 46 will be $K_1E$, it may be of the proportional-plus-integral type, in which case the control signal 45 to control valve 46 will be $K_1E + K_2 \int E\, dt$; it may be of the proportional-plus-derivative type in which case the controller signal 45 to control valve 46 will be $K_1E + K_3 \cdot (dE/dt)$, or it may be of the proportional-plus-integral-plus-derivative type in which case the control signal 45 to control valve 46 will be $K_1E + K_2 \int E\, dt + K_3 \cdot (dE/dt)$. In the presently preferred embodiment of the invention a controller of the proportional-plus-integral type is used. The setting of control valve 46 determines the purge rate.

This control scheme allows the RPM of compressor stages 14 and 15 to be set at a constant value. Suction pressure to the suction drum 12 is maintained by changing the purge rate. This allows the ammonia synthesis loop pressure to seek the highest possible value at the given feed rate of synthesis gas and the given compressor RPM.

An example of this control strategy is as follows: As more synthesis gas becomes available, suction pressure in suction drum 12 will rise. Pressure transducer 41 will sense this rise and through controller 43 manipulate valve 46 to allow the purge rate to increase. The increased purge rate will cause synthesis loop pressure to fall, allowing more synthesis gas in suction drum 12 to enter compressor 14 until the suction pressure in suction drum 12 approaches its optimum value as applied by set point 44. As suction pressure in suction drum 12 drops, control valve 46 will be manipulated toward the closed position and the synthesis loop pressure will again be at its highest possible value. This control scheme assures optimum compressor loading under normal operating conditions.

Figure 2:
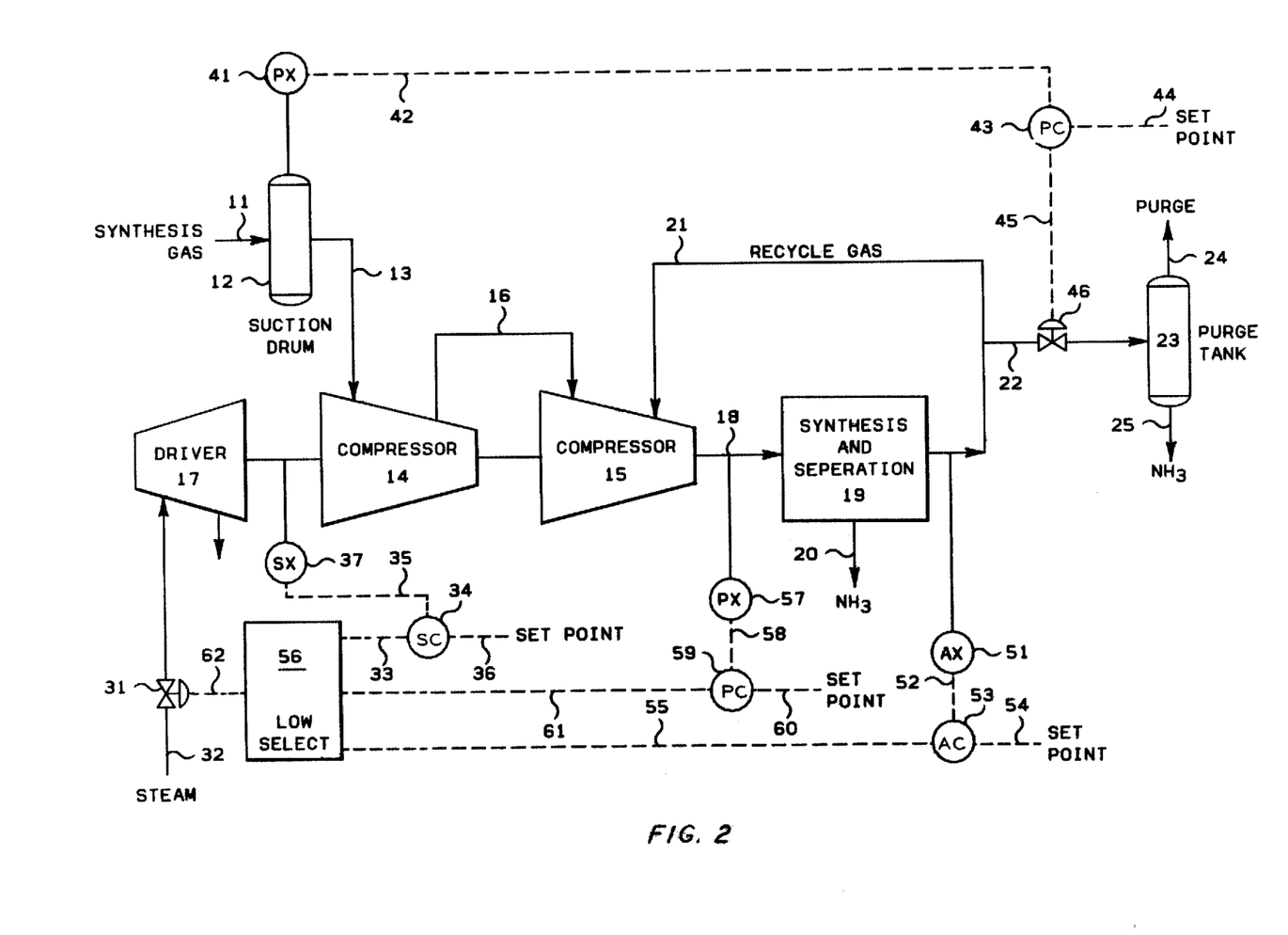
FIG. 2 is a representation of a process for the manufacture of ammonia with the associated means of controlling the manufacturing process shown in FIG. 1 together with a means of providing additional control of the manufacturing process required when the flow rate of the synthesis gas is low.

If low flow rates of synthesis gas are frequently encountered, then additional controls may be required to keep loop pressure at an optimum level and maintain allowable concentrations of inert gases in the recycle gas. FIG. 2 illustrates a control strategy for these abnormal operating conditions.

The process for the synthesis of ammonia illustrated in FIG. 2 is the same as that described for FIG. 1. It should also be noted that pressure transducer 41, controller 43, and pneumatic control valve 46 operate exactly as described for the same configuration in FIG. 1. However where flow rates of synthesis gas are low the purge rate will also be low. This may allow a buildup of inert gases in the recycle gas resulting in a higher synthesis loop pressure and a deleterious effect on the synthesis process. A control strategy to prevent this is shown in FIG. 2. Referring to FIG. 2, a sample of recycle gas is withdrawn from conduit means 21 and introduced into inerts analyzer 51. The inerts analyzer transducer 51 analyses the concentration of the inert gases in the recycle gas and supplies a signal 52 representative thereof to analyzer controller 53. Analyzer controller 53 is also provided with a set point signal 54 which is representative of the optimum concentration of inerts. The analyzer controller 54 compares these two signals in the same manner as previously described for controller 43 and provides a signal 55 representative of the comparison to the low signal selector 56. In like manner pressure transducer 57 measures the actual synthesis loop pressure and supplies a signal 58 representative thereof to pressure controller 59. Pressure controller 59 is also provided with a set point signal 60 which is representative of the optimum synthesis loop pressure. The pressure controller 59 compares these two signals in the same manner as previously described for controller 43 and provides a signal 61 representative of the comparison to the low signal selector 56. The valve set control signal 33 is also provided to the low signal selector 56. The signal 33 is set at a value representing the difference between the actual RPM and the set point RPM of the compressors 14 and 15 in the same manner as previously described. The low signal selector 56 will select the lowest signal from the three inputs described and produce an output signal 62 representative thereof. This will allow the controller sending the lowest signal to manipulate pneumatic control valve 31 through control signal 62. Signal 62 can never exceed the value of signal 33 which prevents the compressors 14 and 15 from being overdriven. If the synthesis loop pressure and the concentration of inerts in the recycle gas are at or near their respective optimum values, the valve set control signal 33 will manipulate pneumatic control valve 31 and the control strategy will be exactly as described for FIG. 1. If the actual synthesis loop pressure or the concentration of inerts in the recycle gas become too high, then either loop pressure controller 59 or inerts concentration controller 53 will manipulate pneumatic control valve 31 causing it to decrease the flow of steam to the driver 17 thus reducing compressor speed. The reduced compressor speed will cause the pressure in the suction drum 12 to rise. This rise will be sensed by pressure transducer 41 and communicated to pressure controller 43, causing pneumatic control valve 46 to open more fully and increase the purge rate, thus reducing synthesis loop pressure and the concentration of inerts in the recycle gas to their respective optimum level.

Figure 3:
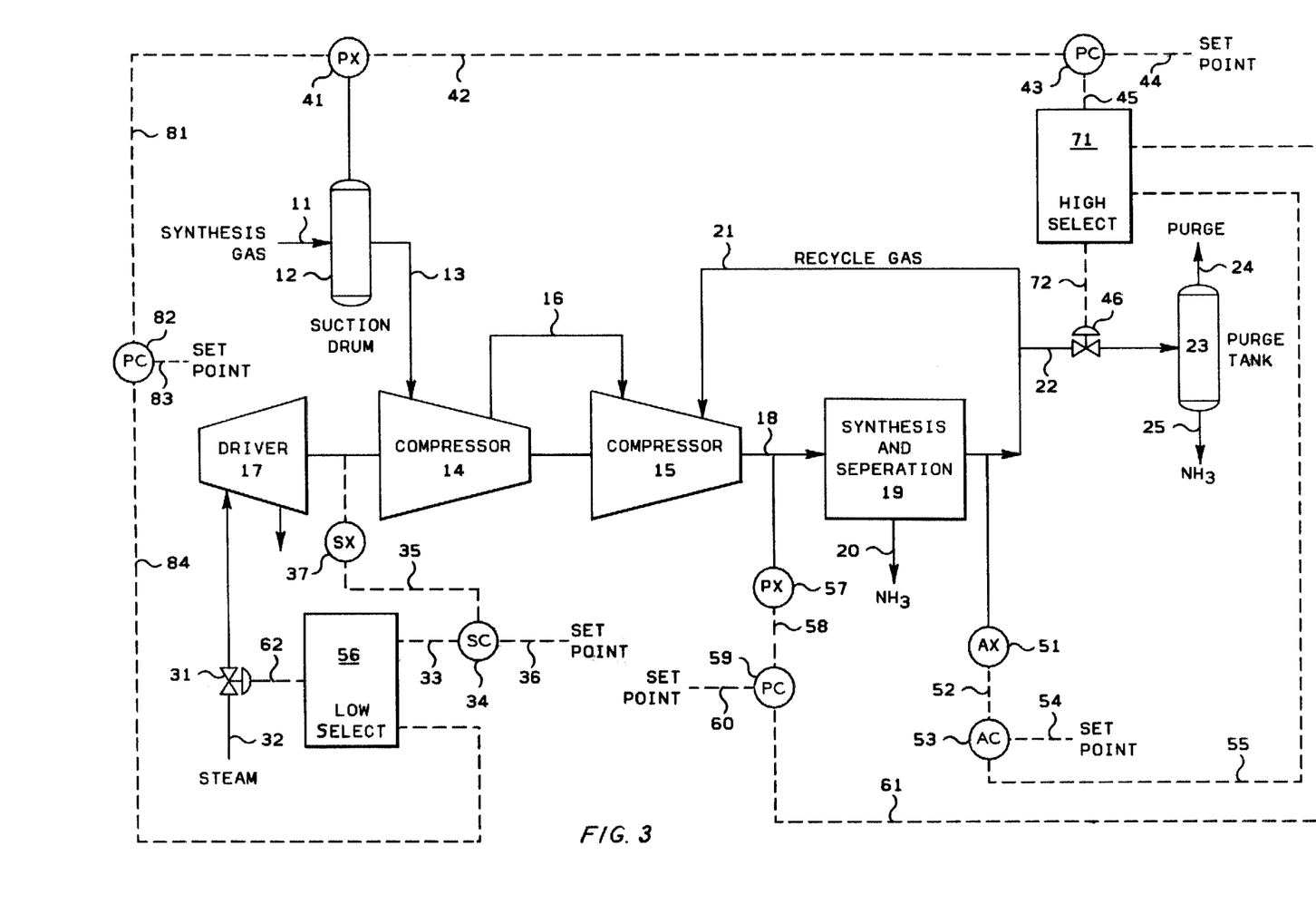
FIG. 3 is a representation of a process for the manufacture of ammonia with the associated means of controlling the manufacturing process shown in FIG. 1 together with a second means of providing additional control of the manufacturing process when the flow rate of the synthesis gas is low.

FIG. 3 illustrates another application of the basic control strategy encompassed by this invention. As in FIG. 2 the control strategy illustrated in FIG. 3 is used to control synthesis loop pressure and concentration of inerts in the recycle gas when the flow rate of synthesis gas is low.

Referring to FIG. 3, the inerts analyzer transducer 51, analyzer controller 53 and set point 54 function exactly as described in the preceding description of the control strategy illustrated by FIG. 2 except that the output control signal 55 of analyzer controller 53 is supplied to high signal selector 71 instead of low signal selector 56. In like manner, pressure transducer 57, loop pressure controller 59, and set point 60 function exactly as described in the preceding description of the control strategy illustrated by FIG. 2 except that the output control signal 61 of loop pressure controller 59 is also supplied to high signal selector 71 instead of low signal selector 56. Pressure transducer 41, suction pressure controller 43, and set point 44 function exactly as described in the preceding description of the control strategy illustrated by FIG. 1 except that the output control signal 45 of pressure controller 43 is supplied to high signal selector 71 instead of directly to pneumatic control valve 46. The high signal selector 71 will select the highest signal from the three inputs described and will allow the controller sending the highest signal to manipulate pneumatic control valve 46 through control signal 72.

When the flow rate of synthesis gas is low the high signal selector 71 allows either loop pressure controller 59 or inerts concentration controller 53 to override suction pressure controller 43 if synthesis loop pressure or inerts concentration in the recycle gas becomes too high. When this occurs the purge rate will increase causing the pressure in suction drum 12 to drop. Pressure transducer 41 will sense this drop and will provide a signal 81 to suction pressure controller 82. Pressure controller 82 is also supplied with a set point signal 83 which is representative of the optimum pressure for suction drum 12. Pressure controller 82 compares these two signals in the same manner as described for controller 43 in the description of the functioning of controller 43 in FIG. 1. Pressure controller 82 provides a control signal 84 to the low signal selector 56. The low signal selector 56 is also provided with the valve set control signal 33 which is set at a value representing the difference between the actual RPM and the set point RPM of the compressors in the same manner as previously described. When suction drum pressure is low the low signal selector will allow pressure controller 82 to manipulate pneumatic control valve 31 resulting in a reduced steam flow through conduit means 32 to the driver 17 and a corresponding reduced compressor speed. This will again allow the synthesis loop pressure to be at its highest possible value at a given flow rate of synthesis gas and a given compressor speed and will provide optimum compressor loading for low feed flow rates of synthesis gas.

Figure 4:
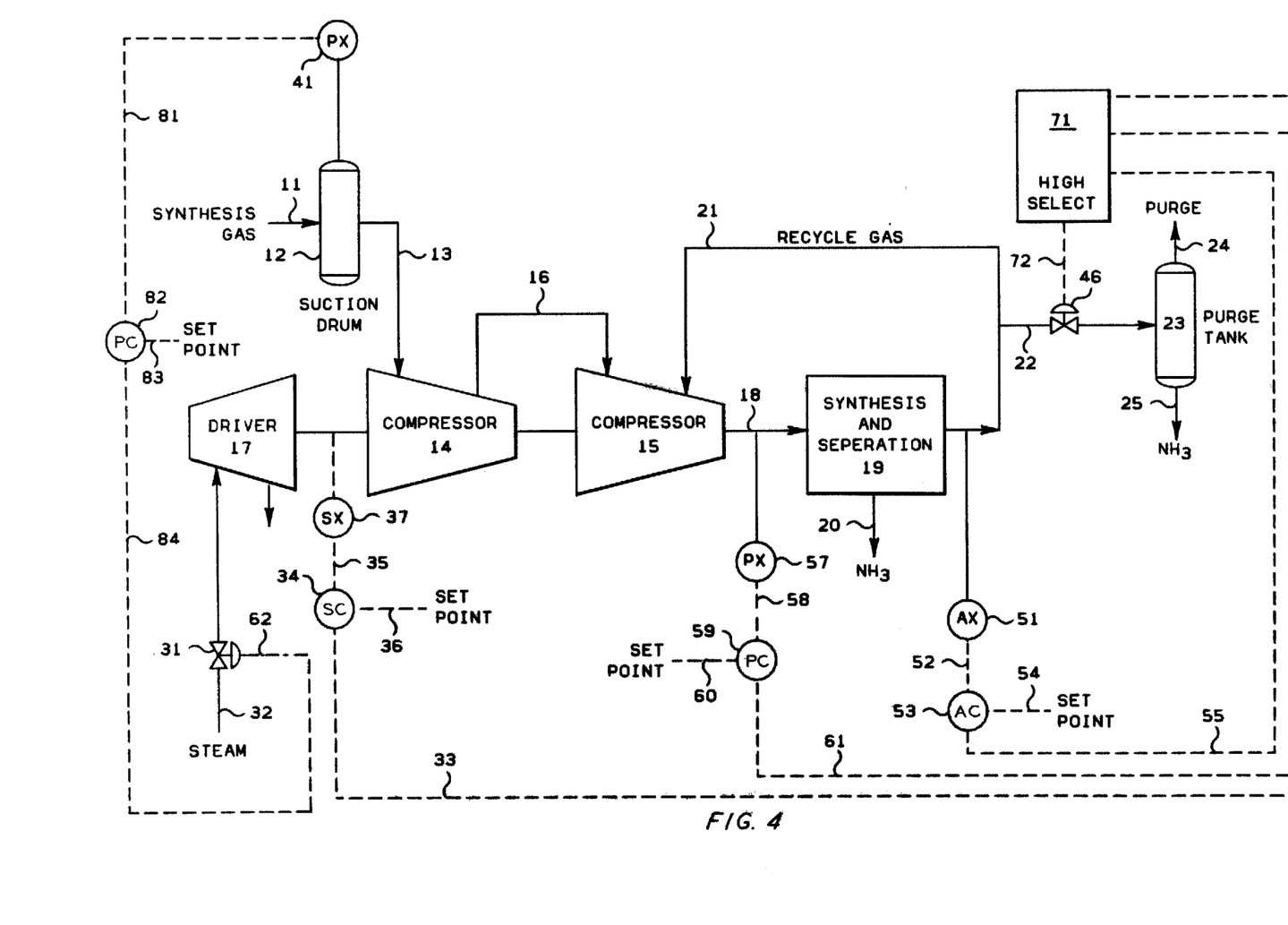
FIG. 4 is a representation of a process for the manufacture of ammonia with an alternative means to that shown in FIG. 1 for controlling the manufacturing process when the synthesis gas flow rate is high together with a third means of providing additional control of the manufacturing process if the synthesis gas flow rate is low.

FIG. 4 illustrates another control strategy for controlling the ammonia manufacturing process where the flow rate of synthesis gas is low. This is the preferred control method in that situation.

Referring to FIG. 4, the inerts analyzer transducer 51, inerts concentration controller 53, and set point 54 function exactly as described in the preceding description of the control strategy illustrated by FIG. 2. As in FIG. 3, the output control signal 55 is again supplied to high signal selector 71. In like manner, pressure transducer 57, loop pressure controller 59, and set point 60 function exactly as described previously for FIG. 2. The output control signal 61 is supplied to the high signal selector 71.

Pressure transducer 41, suction pressure controller 82 and the set point signal 83 function as previously described for FIG. 3. Suction pressure controller 82 is in direct control of pneumatic control valve 31 via control signal 84, thus providing direct manipulation of compressor RPM in response to suction drum 12 pressure.

Speed transducer 37, speed controller 34 and the set point signal 36 function as previously described for FIG. 1. The control output signal 33 is supplied to the high signal selector 71.

The high signal selector 71 will select the highest signal from the three inputs described and will allow the controller sending the highest signal to manipulate pneumatic control valve 46 through control signal 72.

As has been stated the RPM of the compressors is manipulated directly in response to suction drum 12 pressure. If the pressure is high then compressor RPM will be high and high selector 71 will select the RPM signal 33 to manipulate the purge rate of the recycle gas directly. If the feed rate of the synthesis gas is low then the suction pressure will be low and compressor RPM will not be at or near its maximum value. Under these operational conditions the purge rate will be low and the inerts concentration or synthesis loop pressure may become too high. If this occurs then high signal selector 71 allows the purge rate to be controlled by inerts concentration controller 53 or loop pressure controller 59. The purge rate is increased causing suction pressure to decrease. Compressor RPM are decreased in response to lower suction pressure. This will again allow synthesis loop pressure or the inerts concentration to be at its highest possible value at any given flow rate of synthesis gas and will provide optimum compressor loading for low feed flow rates of synthesis gas.

It should be noted at this point that it is preferable that controllers 34, 43, 53, 59 and 82 be tracking controllers with anti-windup features. Such controllers, as is well known in the art, provide for bumpless transfer by a high or low signal selector and prevent continued integration when a controller is not selected to control the pneumatic control valves. The controller listed below under specific components has these features.

Specific components which can be used in the practice of the invention as illustrated by the presently preferred embodiments of FIGS. 1 and 4, and the alternative embodiments of FIGS. 2 and 3 are as follows:

| Control valve 31 | Stabilflo Valve No. A218<br>Foxboro Co.<br>Foxboro, Mass. |
| --- | --- |
| Controllers 34, 43, 53, 59 and 82 | Syncro 350 Indicating Controller<br>Moore Products Co.<br>Tulsa, Oklahoma |
| Speed transducer 37 | No. 14962<br>Moore Products Co.<br>Tulsa, Oklahoma |
| Pressure transducers 41 and 57 | E11GH<br>Foxboro Co.<br>Foxboro, Mass. |
| Control valve 46 | No. A240<br>Foxboro Co.<br>Foxboro, Mass. |
| Inerts analyzer transducer | Optichrome 102 Chromatograph<br>Applied Automation Inc.<br>Bartlesville, Oklahoma |
| Low select relay 56 | No. B05885 Multi-use Amp<br>Applied Automation Inc.<br>Bartlesville, Oklahoma |
| High select relay 71 | No. B05885 Multi-use Amp<br>Applied Automation Inc.<br>Bartlesville, Oklahoma |

The control components listed above are electrical. Because of this, if these components are used, a current to pressure transducer must be employed to convert the current signal from the high and low signal selectors to a pressure signal for use in manipulating a pneumatic control valve. A transducer such as the EP-77 manufactured by Moore Products, Tulsa, Okla. is suitable. Different control instrumentation such as pneumatic control is also within the scope of this invention.

The method and apparatus illustrated in FIG. 1 is the preferred embodiment of this invention when the feed flow rate of synthesis gas is high and no problems with inerts concentration or synthesis loop pressure are likely to be encountered. If synthesis loop pressure or concentration of inert gases in the recycle gas is considered a problem then the method and apparatus of FIG. 1 may be modified as shown in FIGS. 2, 3 or 4 to provide additional control. The method and apparatus illustrated in FIG. 4 is the preferred embodiment of this invention when the feed flow rate of synthesis gas is low and the concentration of inerts in the recycle gas or synthesis loop pressure is likely to be a problem.

While the invention has been described in terms of the presently preferred embodiments and alternatives, reasonable variations and modifications are possible, by those skilled in the art, within the scope of the described inventions and the appended claims. Such variations as using variables, other than the concentration of inerts in the recycle gas and synthesis loop pressure, which may be critical in some ammonia plants for additional control is within the scope of the invention.

That which is claimed is:

1. Apparatus comprising:
    compression means for compressing gases;
    means for passing a stream of synthesis gas containing hydrogen, nitrogen, and a small percentage of inert gases into said compression means to therein compress said synthesis gas to a suitably high pressure;
    means for controlling the speed of said compression means;
    synthesis means for producing ammonia from synthesis gas and for separating ammonia from the synthesis gas which did not react to form ammonia;
    means for passing the thus compressed synthesis gas to said synthesis means wherein ammonia is formed from said compressed synthesis gas and ammonia is separated from the unreacted compressed synthesis gas;
    means for passing at least a portion of the thus separated, unreacted compressed synthesis gas as recycle gas to said compression means to be combined with fresh synthesis gas and fed to said synthesis means;
    means for purging a portion of said recycle gas;
    means for measuring the pressure of said synthesis gas at the inlet of said compression means and for producing a first signal representative thereof;
    means for generating a second signal representative of the desired pressure of said synthesis gas at the inlet of said compression means;
    means for comparing said first signal and said second signal and for producing a third signal representative of said comparison; and
    means for manipulating the purging of said recycle gas in response to said third signal.

2. Apparatus in accordance with claim 1 wherein said means for controlling the speed of said compression means comprises:
    means for measuring the speed of said compression means and for producing a fourth signal representative thereof;
    means for generating a fifth signal representative of the desired speed of said compression means;
    means for comparing said fourth signal and said fifth signal and for producing a sixth signal representative of said comparison;
    means for measuring the concentration of inert gases in said recycle gas and for producing a seventh signal representative thereof;
    means for generating an eighth signal representative of the desired concentration of said inert gases in said recycle gas;
    means for comparing said seventh signal and said eighth signal and for producing a ninth signal representative of said comparison;
    means for measuring the pressure of the compressed synthesis gas between said compression means and said synthesis means and for producing a tenth signal representative thereof;

means for generating an eleventh signal representative of the desired compressed synthesis gas pressure;

means for comparing said tenth signal and said eleventh signal and for producing a twelfth signal representative of said comparison; and means for manipulating the speed of said compression means in response to the lower of said sixth, ninth, and twelfth signals.

3. Apparatus in accordance with claim 2 wherein said means for comparing said fourth signal with said fifth signal comprises means for establishing the difference between said fourth signal and fifth signals;

wherein said means for comparing said seventh signal with said eighth signal comprises means for establishing the difference between said seventh and eighth signals; and wherein said means for comparing said tenth signal with said eleventh signal comprises means for establishing the difference between said tenth and eleventh signals.

4. Apparatus in accordance with claim 2 wherein said means for manipulating the speed of said compression means in response to the lower of said sixth, ninth and twelfth signals is a low signal selector capable of switching control from one input signal to another as the input signals thereto vary in strength.

5. Apparatus in accordance with claim 1 wherein said means for controlling the speed of said compression means comprises:

means for measuring the speed of said compression means and for producing a fourth signal representative thereof;

means for generating a fifth signal representative of the desired speed of said compression means;

means for comparing said fourth signal and said fifth signal and for producing a sixth signal representative of said comparison; and means for manipulating the speed of said compression means in response to said sixth signal.

6. Apparatus in accordance with claim 5 wherein said means for comparing said fourth signal with said fifth signal comprises means for establishing the difference between said fourth and fifth signals.

7. Apparatus in accordance with claim 1 wherein said means for comparing said first signal with said second signal comprises means for establishing the difference between said first and second signals.

8. Apparatus comprising:

compression means for compressing gases;

means for passing a stream of synthesis gas containing hydrogen, nitrogen, and a small percentage of inert gases into said compression means to therein compress said synthesis gas to a suitably high pressure;

means for controlling the speed of said compression means;

synthesis means for producing ammonia from synthesis gas and for separating ammonia from the synthesis gas which did not react to form ammonia;

means for passing the thus compressed synthesis gas to said synthesis means wherein ammonia is formed from said compressed synthesis gas and ammonia is separated from the unreacted compressed synthesis gas;

means for passing at least a portion of the thus separated, unreacted compressed synthesis gas as recycle gas to said compression means to be combined with fresh synthesis gas and fed to said synthesis means;

means for purging a portion of said recycle gas;

means for measuring the pressure of said synthesis gas at the inlet of said compression means and for producing a first signal representative thereof;

means for generating a second signal representative of the desired pressure of said synthesis gas at the inlet of said compression means;

means for comparing said first signal and said second signal and for producing a third signal representative of said comparison;

means for measuring the concentration of inert gases in said recycle gas and for producing a fourth signal representative thereof;

means for generating a fifth signal representative of the desired concentration of said inert gases;

means for comparing said fourth signal and said fifth signal and for producing a sixth signal representative of said comparison;

means for measuring the pressure of the compressed synthesis gas between said compression means and said synthesis means and for producing a seventh signal representative thereof;

means for generating an eighth signal representative of the desired compressed synthesis gas pressure;

means for comparing said seventh signal and said eighth signal and for producing a ninth signal representative of said comparison; and means for manipulating the said purging of said recycle gas in response to the higher of said third, sixth and ninth signals.

9. Apparatus in accordance with claim 8 wherein said means for controlling the speed of said compression system comprises:

means for measuring the speed of said compression means and for producing a tenth signal representative thereof;

means for generating an eleventh signal representative of the desired speed of said compression means;

means for comparing said tenth signal and said eleventh signal and for producing a twelfth signal representative of said comparison; and means for manipulating the speed of said compression means in response to the lower of said third and twelfth signals.

10. Apparatus in accordance with claim 9 wherein said means for comparing said tenth signal with said eleventh signal comprises means for establishing the difference between said tenth signal and said eleventh signal.

11. Apparatus in accordance with claim 9 wherein said means for manipulating the speed of said compression means in response to the lower of said third and twelfth signals comprises a low signal selector capable of switching control from one input signal to another as the input signals thereto vary in strength.

12. Apparatus in accordance with claim 8 wherein said means for comparing said first signal with said second signal comprises means for establishing the difference between said first and second signals;

wherein said means for comparing said fourth signal with said fifth signal comprises means for establishing the difference between said fourth signal and said fifth signals; and wherein said means for comparing said seventh signal with said eighth signal comprises means for establishing the difference between said seventh and said eighth signals.

13. Apparatus in accordance with claim 8 wherein said means for manipulating the purging of said recycle gas in response to the higher of said third, sixth and ninth signals comprises a high signal selector capable of switching control from one input signal to another as the input signals thereto vary in strength.

14. Apparatus comprising:
compression means for compressing gases;
means for passing a stream of synthesis gas containing hydrogen, nitrogen, and a small percentage of inert gases into said compression means to therein compress said synthesis gas to a suitably high pressure;
means for controlling the speed of said compression means;
synthesis means for producing ammonia from synthesis gas and for separating ammonia from the synthesis gas which did not react to form ammonia;
means for passing the thus compressed synthesis gas to said synthesis means wherein ammonia is formed from said compressed synthesis gas and ammonia is separated from the unreacted compressed synthesis gas;
means for passing at least a portion of the thus separated, unreacted compressed synthesis gas as recycle gas to said compression means to be combined with fresh synthesis gas and fed to said synthesis means;
means for purging a portion of said recycle gas;
means for measuring the speed of said compression means and for producing a first signal representative thereof;
means for generating a second signal representative of the desired speed of said compression systems;
means for comparing said first signal and said second signal and for producing a third signal representative of said comparison;
means for measuring the concentration of inert gases in said recycle gas and for producing a fourth signal representative thereof;
means for generating a fifth signal representative of the desired concentration of said inert gases in said recycle gas;
means for comparing said fourth signal and said fifth signal and for producing a sixth signal representative of said comparison;
means for measuring the pressure of the compressed synthesis gas between said compression means and said synthesis means and for producing a seventh signal representative thereof;
means for generating an eighth signal representative of the desired compressed synthesis gas pressure;
means for comparing said seventh signal and said eighth signal and for producing a ninth signal representative of said comparison; and
means for manipulating the purging of said recycle gas in response to the higher of said third, sixth and ninth signals.

15. Apparatus in accordance with claim 14 wherein said means for controlling the speed of said compression system comprises:
means for measuring the pressure of said synthesis gas at the inlet of said compression means and for producing a tenth signal representative thereof;
means for generating an eleventh signal representative of the desired pressure of said synthesis gas at the inlet of said compression means;
means for comparing said tenth signal and said eleventh signal and for producing a twelfth signal representative of said comparison; and
means for manipulating the speed of said compression means in response to said twelfth signal.

16. Apparatus in accordance with claim 15 wherein said means for comparing said tenth signal with said eleventh signal comprises means for establishing the difference between said tenth and eleventh signals.

17. Apparatus in accordance with claim 14 wherein said means for comparing said first signal with said second signal comprises means for establishing the difference between said first and second signals;
wherein said means for comparing said fourth signal with said fifth signal comprises means for establishing the difference between said fourth signal and said fifth signal; and
wherein said means for comparing said seventh signal with said eighth signal comprises means for establishing the difference between said seventh signal and said eighth signal.

18. Apparatus in accordance with claim 14 wherein said means for manipulating the purging of said recycle gas in response to the higher of said third, sixth and ninth signals is a high signal selector capable of switching control from one input signal to another as the input signals thereto vary in strength.

19. A method for controlling the production of ammonia comprising:
passing a stream of synthesis gas containing hydrogen, nitrogen and a small percentage of inert gases at a given flow rate into a compression means operating at some desired speed to compress said synthesis gas to a suitably high pressure;
passing the thus compressed gas to a synthesis and separation means where ammonia is formed from said compressed gas;
separating ammonia from the compressed synthesis gas which did not react to form ammonia;
passing at least a portion of the thus separated unreacted compressed synthesis gas as recycle gas to said compression means to be combined with fresh synthesis gas and be fed to said synthesis and separation means;
measuring the pressure of said synthesis gas at the inlet of said compression means and producing a first signal representative thereof;
generating a second signal representative of the desired pressure of said synthesis gas at the inlet of said compression means;
comparing said first signal and said second signal and producing a third signal representative of said comparison; and
controlling the said purging of said recycle gas in response to said third signal.

20. A method in accordance with claim 19 wherein said compression system speed is maintained at a desired value by:
measuring the speed of said compression means and producing a fourth signal representative thereof;
generating a fifth signal representative of the desired speed of said compression means;
comparing said fourth signal and said fifth signal and producing a sixth signal representative of said comparison; and
manipulating the speed of said compression means in response to said sixth signal.

21. A method in accordance with claim 19 wherein said compression means speed is maintained at some desired value by:
   measuring the speed of said compression means and producing a fourth signal representative thereof;
   generating a fifth signal representative of the desired speed of said compression means;
   comparing said fourth signal and said fifth signal and producing a sixth signal representative of said comparison;
   measuring the concentration of inert gases in said recycle gas and producing a seventh signal representative thereof;
   generating an eighth signal representative of the desired concentration of said inert gases in said recycle gas;
   comparing said seventh signal and said eighth signal and producing a ninth signal representative of said comparison;
   measuring the pressure of the compressed synthesis gas between said compression means and said synthesis and separation means and producing a tenth signal representative thereof;
   generating an eleventh signal representative of the desired compressed synthesis gas pressure;
   comparing said tenth signal and said eleventh signal and producing a twelfth signal representative of said comparison; and
   controlling the speed of said compression means in response to the lower of the said sixth, ninth and twelfth signals.

22. A method for controlling the production of ammonia comprising:
   passing a stream of synthesis gas containing hydrogen, nitrogen and a small percentage of inert gases at a given flow rate into a compression means operating at some desired speed to compress said synthesis gas to a suitably high pressure;
   passing the thus compressed gas to a synthesis and separation means where ammonia is formed from said compressed gas;
   separating ammonia from the compressed synthesis gas which did not react to form ammonia;
   passing at least a portion of the thus separated unreacted compressed synthesis gas as recycle gas to said compression means to be combined with fresh synthesis gas and be fed to said synthesis and separation means;
   measuring the pressure of said synthesis gas at the inlet of said compression means and producing a first signal representative thereof;
   generating a second signal representative of the desired pressure of said synthesis gas at the inlet of said compression means;
   comparing said first signal and said second signal and producing a third signal representative of said comparison;
   measuring the concentration of inert gases in said recycle gas and producing a fourth signal representative thereof;
   generating a fifth signal representative of the desired concentration of said inert gases in said recycle gas;
   comparing said fourth signal and said fifth signal and producing a sixth signal representative of said comparison;
   measuring the pressure of the compressed synthesis gas between said compression means and said synthesis and separation means and producing a seventh signal representative thereof;
   generating an eighth signal representative of the desired compressed synthesis gas pressure;
   comparing said seventh signal and said eighth signal and producing a ninth signal representative of said comparison; and
   controlling the said purging of a portion of said recycle gas in response to the higher of said third, sixth and ninth signals.

23. A method in accordance with claim 22 wherein the compression means speed is maintained at a desired value by:
   measuring the speed of said compression means and producing a tenth signal representative thereof;
   generating an eleventh signal representative of the desired speed of said compression means;
   comparing said tenth signal and said eleventh signal and producing a twelfth signal representative of said comparison; and
   controlling the speed of said compression means in response to the lower of said third and twelfth signals.

24. A method for controlling the production of ammonia comprising:
   passing a stream of synthesis gas containing hydrogen, nitrogen and a small percentage of inert gases at a given flow rate into a compression means operating at some desired speed to compress said synthesis gas to a suitably high pressure;
   passing the thus compressed gas to a synthesis and separation means where ammonia is formed from said compressed gas;
   separating ammonia from the compressed synthesis gas which did not react to form ammonia;
   passing at least a portion of the thus separated unreacted compressed synthesis gas as recycle gas to said compression means to be combined with fresh synthesis gas and be fed to said synthesis and separation means;
   measuring the speed of said compression means and producing a first signal representative thereof;
   generating a second signal representative of the desired speed of said compression means;
   comparing said first signal and said second signal and producing a sixth signal representative of said comparison;
   measuring the concentration of inert gases in said recycle gas and producing a fourth signal representative thereof;
   generating a fifth signal representative of the desired concentration of said inert gases in said recycle gas;
   comparing said fourth signal and said fifth signal and producing a sixth signal representative of said comparison;
   measuring the pressure of the compressed synthesis gas between said compression means and said synthesis and separation means and producing a seventh signal representative thereof;
   generating an eighth signal representative of the desired compressed synthesis gas pressure;
   comparing said seventh signal and said eighth signal and producing a ninth signal representative of said comparison; and
   controlling the said purging of a portion of said recycle gas in response to the higher of said third, sixth and ninth signals.

25. A method in accordance with claim 24 wherein said compression means speed is maintained at some desired value by:

measuring the pressure of said synthesis gas at the inlet of said compression means and producing a tenth signal representative thereof;

generating an eleventh signal representative of the desired pressure of said synthesis gas at the inlet of said compression means;

comparing said tenth signal and said eleventh signal and producing a twelfth signal representative of said comparison; and maintaining the said compression means at some desired speed in response to said twelfth signal.

* * * * *